US007149413B2

(12) United States Patent
Chotoku et al.

(10) Patent No.: US 7,149,413 B2
(45) Date of Patent: Dec. 12, 2006

(54) VIDEO-SIGNAL RECORDING AND PLAYBACK APPARATUS, VIDEO-SIGNAL RECORDING AND PLAYBACK METHOD, AND RECORDING MEDIUM

(75) Inventors: Koichi Chotoku, Tokyo (JP); Takeshi Yamauchi, Chiba (JP); Takashi Karimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 09/904,322

(22) Filed: Jul. 12, 2001

(65) Prior Publication Data

US 2002/0006272 A1 Jan. 17, 2002

(30) Foreign Application Priority Data

Jul. 13, 2000 (JP) .......................... P2000-212294

(51) Int. Cl.
*H04N 5/91* (2006.01)

(52) U.S. Cl. ........................ 386/95; 386/120; 386/121

(58) Field of Classification Search ................ 707/1–6, 707/104; 382/305; 386/21, 27, 33, 35–38, 386/40, 46, 69, 95, 117, 120, 121; 360/5; 358/909.1

See application file for complete search history.

(56) References Cited

U.S. PATENT DOCUMENTS 5,809,202 A * 9/1998 Gotoh et al. .................. 386/69
6,728,473 B1 * 4/2004 Chotoku et al. .............. 386/95

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

A video-signal recording and playback apparatus for recording and playing back a video signal of a television-broadcast program include a recording mechanism for recording a video signal onto an information-recording medium; an extracting mechanism for extracting a representative picture from a video signal to be recorded; an attaching mechanism for attaching an evaluation value to a representative picture extracted by the extracting mechanism; a preserving mechanism for preserving a representative picture extracted by the extracting mechanism in the information-recording medium; and a thinning mechanism for carrying out a thinning process on a number of representative pictures preserved by the preserving mechanism in the information-recording medium on the basis of the evaluation value attached by the attaching mechanism.

6 Claims, 5 Drawing Sheets

START
S1 RECORDING HAS BEEN ENDED ? — YES → END; NO
S2 REPRESENTATIVE PICTURES HAVE BEEN DETECTED ? — NO; YES
S3 COMPUTE EVALUATION VALUE AND RECORD IT ON RECORDING MEDIUM
S4 COMPARE THE NUMBER OF REPRESENTATIVE PICTURES WITH UPPER LIMIT
S5 THINNING PROCESS NEEDED ? — NO; YES
S6 SEARCH REPRESENTATIVE PICTURES FOR ONE WITH SMALLEST EVALUATION VALUE
S7 REPRESENTATIVE PICTURES BECOME TOO THIN ? — YES; NO
S8 PERFORM THINNING PROCESS
S9 REPRESENTATIVE PICTURES REMAIN TO BE SEARCHED ? — YES; NO
S10 RELIEVE CONDITION OF "BECOMING TOO THIN"
S11 SEARCH REPRESENTATIVE PICTURES FOR ONE WITH NEXT LARGER SMALLEST EVALUATION VALUE

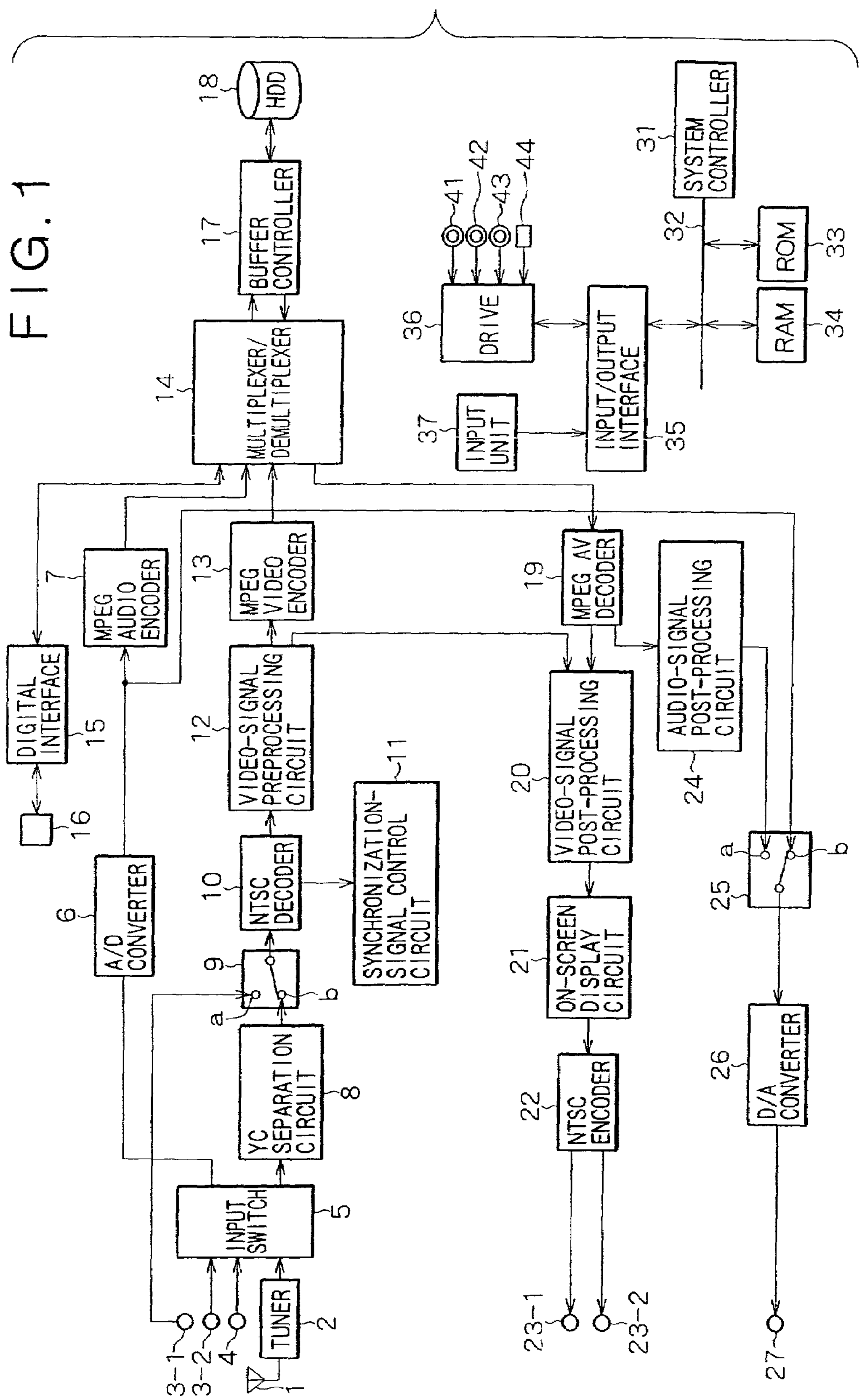
FIG. 1
HDD
BUFFER CONTROLLER
MULTIPLEXER/ DEMULTIPLEXER
DRIVE
SYSTEM CONTROLLER
ROM
RAM
INPUT UNIT
INPUT/OUTPUT INTERFACE
DIGITAL INTERFACE
MPEG AUDIO ENCODER
MPEG VIDEO ENCODER
MPEG AV DECODER
AUDIO-SIGNAL POST-PROCESSING CIRCUIT
VIDEO-SIGNAL PREPROCESSING CIRCUIT
VIDEO-SIGNAL POST-PROCESSING CIRCUIT
SYNCHRONIZATION-SIGNAL CONTROL CIRCUIT
A/D CONVERTER
NTSC DECODER
ON-SCREEN DISPLAY CIRCUIT
YC SEPARATION CIRCUIT
NTSC ENCODER
D/A CONVERTER
INPUT SWITCH
TUNER

STATE 1
RECORDING START
A
50
B
55
C
30
D
60
E
40
F
45
G
70
PRESENT TIME
TIME

STATE 2
RECORDING START
A
50
B
55
C
30
D
60
E
40
F
45
G
70
H
65
PRESENT TIME
TIME
11 MINUTES
7 MINUTES

STATE 3
RECORDING START
A
50
B
55
C
30
D
60
F
45
G
70
H
65
PRESENT TIME
TIME

VIDEO-SIGNAL RECORDING AND PLAYBACK APPARATUS, VIDEO-SIGNAL RECORDING AND PLAYBACK METHOD, AND RECORDING MEDIUM

BACKGROUND OF THE INVENTION

In general, the present invention relates to a video-signal recording and playback apparatus, a video-signal recording and playback method and a recording medium. More particularly, the present invention relates to a video-signal recording and playback apparatus, a video-signal recording and playback method and a recording medium suitable for a case in which a recommended position to a start an operation to playback a video signal from a recording medium is provided to select representative pictures.

In order to allow the user to grasp the contents of a program recorded on a recording medium or the contents of a group of such programs, or in order to search such a recording medium for a program, there is provided a method whereby a plurality of shrunk static pictures or moving pictures each representing a program or a scene is displayed on a screen and the user is allowed to specify one of the displayed pictures in order to select a desired program or a desired scene of a program.

Traditionally, a set of pictures each representing a program or a scene comprises characteristic pictures automatically extracted and cataloged as candidates for representative pictures. However, the number of such representative pictures may be too large for use by the user to grasp the contents of a program of interest to the user or to specify a start position of a playback operation.

By the way, in determination of a representative picture by adoption of the method described above, the following problems are raised.

A plurality of representative pictures having almost the same contents may be inadvertently recorded. In addition, a number of representative pictures may be inadvertently recorded for a relatively short program.

As a result, in determination of a start position of a program, it is quite within the bounds of possibility that a search for a representative picture representing the start position cannot be carried out with a high degree of efficiency due to the fact that too many ineffective representative pictures must be searched.

In addition, if a thinning process of representative pictures is carried out at the end of a recording operation or in a playback operation instead of being carried out during the recording operation, the responsiveness to a recording and/or playback demand raised by the user deteriorates since it takes too long time to complete the playback operation due to the thinning process.

SUMMARY OF THE INVENTION

It is thus an object of the present invention addressing the problems described above to carry out a thinning process on a number of representative pictures so as to allow video signals recorded on a recording medium to be searched with a high degree of efficiency.

In carrying out the invention and according to one aspect thereof, there is provided a video-signal recording and playback apparatus for recording and playing back a video signal of a television-broadcast program, the video-signal recording and playback apparatus comprising: recording means for recording a video signal onto an information-recording medium; extracting means for extracting a representative picture from a video signal to be recorded; attaching means for attaching an evaluation value to a representative picture extracted by the extracting means; preserving means for preserving a representative picture extracted by the extracting means in the information-recording medium; and thinning means for carrying out a thinning process on a number of representative pictures preserved by the preserving means in the information-recording medium on the basis of the evaluation value attached by the attaching means.

According to a second aspect of the invention, there is provided a video-signal recording and playback method adopted in a video-signal recording and playback apparatus for recording and playing back a video signal of a television-broadcast program, the video-signal recording and playback method comprising: a recording step of recording a video signal onto an information-recording medium; an extracting step of extracting a representative picture from the video signal to be recorded; an attaching step of attaching an evaluation value to the representative picture extracted at the extracting step; a preserving step of preserving the representative picture extracted at the extracting step in the information-recording medium; and a thinning step of carrying out a thinning process on a number of representative pictures preserved at the preserving step in the information-recording medium on the basis of the evaluation value attached by the attaching means.

According to a third aspect of the invention, there is provided a recording medium for storing a program to be executed by a video-signal recording and playback apparatus for recording and playing back a video signal of a television-broadcast program, wherein the program is a computer readable program, the program comprises: a recording step of recording a video signal onto an information-recording medium; an extracting step of extracting a representative picture from the video signal to be recorded; an attaching step of attaching an evaluation value to the representative picture extracted at the extracting step; a preserving step of preserving the representative picture extracted at the extracting step in the information-recording medium; and a thinning step of carrying out a thinning process on a number of representative pictures preserved at the preserving step in the information-recording medium on the basis of the evaluation value attached by the attaching means.

With this configuration, in accordance with the present invention's video-signal recording and playback apparatus and video-signal recording and playback method and a program recorded in a recording medium provided by the present invention, a video signal is recorded onto an information-recording medium; a representative picture is extracted from the video signal to be recorded; an evaluation value is attached to the representative picture; the representative picture is preserved in the information-recording medium; and a thinning process is carried out on a number of representative pictures preserved in the information-recording medium. As a result, it is possible to record only representative pictures that allow recorded video signals to be searched with a high degree of efficiency.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a typical configuration of a hard-disc recorder implemented by an embodiment of the present invention;

DETAILED DESCRIPTION OF PREFERRED EMBODIMENTS

Figure 2:
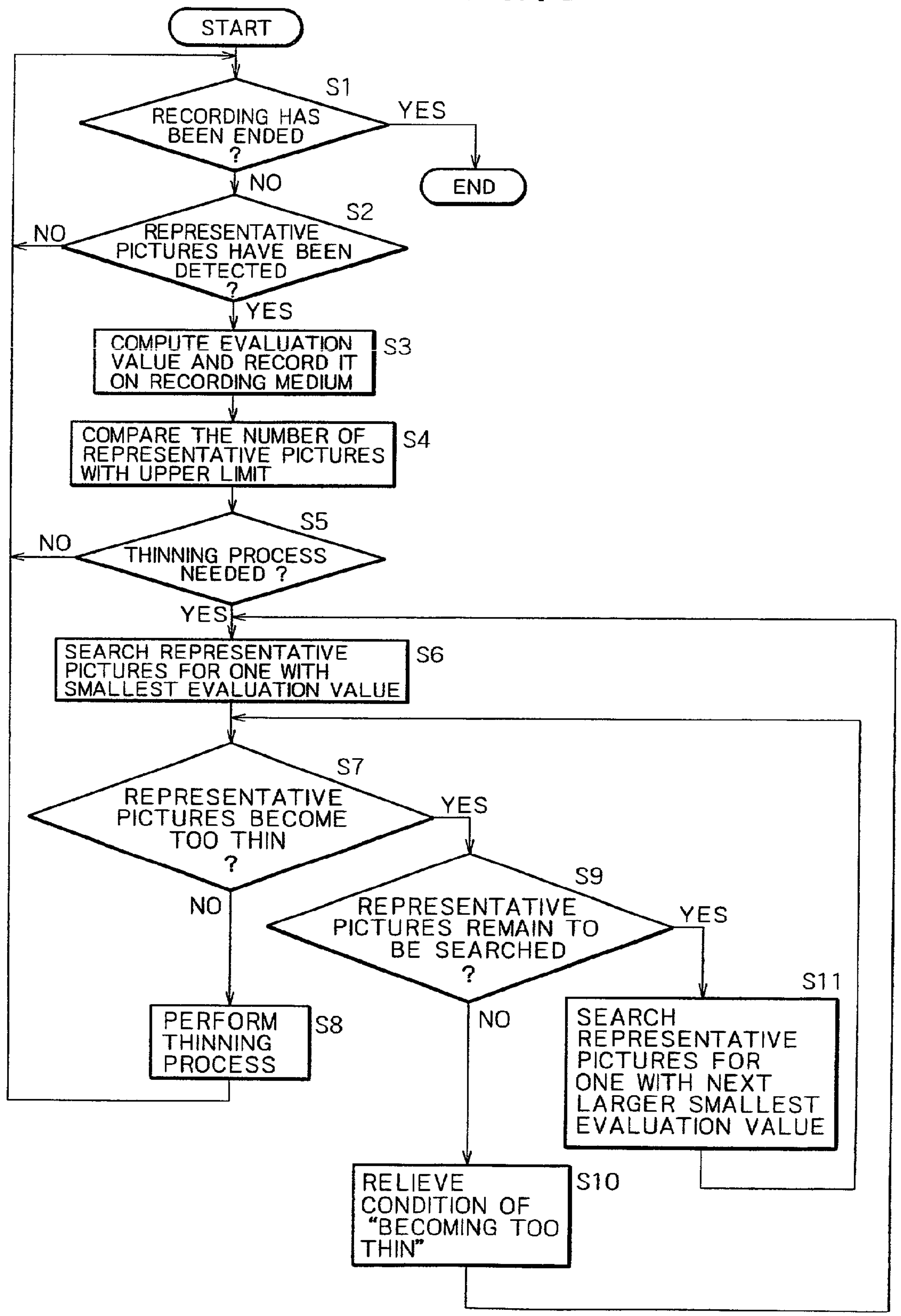
FIG. 2 is a flowchart representing a thinning process carried out on representative pictures of the hard-disc recorder.

A hard-disc recorder implemented by a preferred embodiment of the present invention is explained by referring to diagrams as follows.

FIG. 1 is a block diagram showing a typical configuration of a hard-disc recorder. An antenna 1 receives a television broadcast and supplies a signal of the broadcast to a tuner 2. In accordance with a command issued by a system controller 31, the tuner 2 extracts a signal of a program of a predetermined channel from the television broadcast's signal received from the antenna 1. The extracted signal is supplied to an input switch 5.

An external apparatus not shown in the figure supplies an S video signal to a terminal a of a switch 9 by way of an external video input terminal 3-1. An S video signal is separated signals comprising a Y signal (luminance signal) and a C signal (chrominance signal). An external apparatus not shown in the figure supplies a composite video signal to the input switch 5 by way of an external video input terminal 3-2. An external apparatus not shown in the figure supplies an audio signal to the input switch 5 by way of an external video input terminal 4.

In accordance with a command issued by the system controller 31, the input switch 5 selects a desired signal from the video signal and the audio signal, which are supplied thereto. If the selected signal is the composite video signal, the input switch 5 supplies the selected composite video signal to a YC circuit 8. If the selected signal is the audio signal, on the other hand, the input switch 5 supplies the selected audio signal to an A/D (Analog to Digital) converter 6.

The A/D converter 6 converts an audio signal received from the input switch 5 into digital data by A/D conversion and supplies the digital data to an MPEG (Moving Picture Experts Group) audio encoder 7. The A/D converter 6 also supplies the digital audio data obtained as a result of the A/D conversion to a terminal b of the input switch 25. In accordance with a command issued by the system controller 31, the MPEG audio encoder 7 carries out a compression process adopting an MPEG technique on the digital audio data received from the A/D converter 6 to generate an audio ES (elementary stream). The MPEG audio encoder 7 supplies the audio ES to a multiplexer/demultiplexer 14.

In accordance with a command issued by the system controller 31, a YC separation circuit 8 separates a composite video signal received from the input switch 5 into a luminance signal (or a Y signal) and a chrominance signal (or a C signal). The YC separation circuit 8 supplies the Y signal and the C signal to an NTSC (National Television System Committee) decoder 10 by way of a terminal b of the switch 9. In accordance with a command issued by the system controller 31, the switch 9 changes its contact to a terminal a to forward an S signal received from an external apparatus to the NTSC decoder 10. Also in accordance with a command issued by the system controller 31, the switch 9 changes its contact to a terminal b to forward Y and C signals received from the YC separation circuit 8 to the NTSC decoder 10.

In accordance with a command issued by the system controller 31, the NTSC decoder 10 carries out processes such as A/D conversion and chroma encode processing on a video signal received from the switch 9 to convert the video signal into a digital component video signal referred to hereafter as picture data. The NTSC decoder 10 supplies the picture data to a video-signal preprocessing circuit 12. The NTSC decoder 10 also generates a clock signal based on a horizontal synchronization signal of a received video signal. In addition, the NTSC decoder 10 supplies a field-identifying signal, a vertical synchronization signal and the horizontal synchronization signal obtained as a result of synchronous separation to a synchronization-signal control circuit 11.

In accordance with a command issued by the system controller 31, the synchronization-signal control circuit 11 generates clock and synchronization signals with the field-identifying signal, the vertical synchronization signal and the horizontal synchronization from the NTSC decoder 10 used as a reference. The synchronization-signal control circuit 11 supplies the generated clock and synchronization signals to a variety of components.

In accordance with a command issued by the system controller 31, the video-signal preprocessing circuit 12 carries out video signal processing such as pre-filtering on picture data received from the NTSC decoder 10 to generate a representative picture. The video-signal preprocessing circuit 12 supplies the representative picture to an MPEG video encoder 13 and a video-signal post-processing circuit 20. In accordance with a command issued by the system controller 31, the MPEG video encoder 13 carries out an encoding process such as DCT (Discrete Cosine Transform) processing on picture data received from the video-signal preprocessing circuit 12 to generate an elementary stream of the picture. The MPEG video encoder 13 supplies the elementary stream to the multiplexer/demultiplexer 14.

In accordance with a command issued by the system controller 31, in a recording operation, the multiplexer/demultiplexer 14 multiplexes an elementary stream of a picture and an audio elementary stream, which has completed compression adopting the MPEG technique, as well as a variety of control signals to generate typically an MPEG TS (transport stream). The video-signal preprocessing circuit 12 supplies the MPEG TS to a buffer controller 17. In a playback operation, on the other hand, the multiplexer/demultiplexer 14 demultiplexes an MPEG TS received from the buffer controller 17 to extract a PES (Packetized Elementary Stream) from the MPEG TS. The multiplexer/demultiplexer 14 supplies the extracted PES to an MPEG AV decoder 19.

In accordance with a command issued by the system controller 31, the buffer controller 17 executes control to intermittently supply a transport stream received continuously from the multiplexer/demultiplexer 14 to an HDD (Hard-Disc Drive) 18. While the HDD 18 is carrying out a seek operation, for example, a transport stream cannot be written into a hard disc of the HDD 18. In this case, the transport stream is stored temporarily in a buffer. As the seek operation is completed, allowing a transport stream to be written into the hard disc, the stream is read out from the buffer and stored into the hard disc at a rate higher than a rate of inputting data to the buffer. In this way, a transport stream received continuously from the multiplexer/demultiplexer 14 can be all written into the hard disc of the HDD 18.

The buffer controller 17 also executes control to store signal received from the HDD 18 intermittently into a buffer so that the stored signal can be supplied to the multiplexer/demultiplexer 14 as a continuous transport stream.

In accordance with a command issued by the system controller 31, the HDD 18 stores a transport stream received from the buffer controller 17 intermittently into the hard disc at a predetermined address. The HDD 18 also seeks a predetermined address, reads out a transport stream from the address and supplies the stream to the buffer controller 17.

The buffer controller 17 and the HDD 18 adopt an IDE (Integrated Drive Electronics) protocol. It should be noted, however, that any protocol can be adopted in the present invention as long as the protocol is used for recording a transport stream.

In accordance with a command issued by the system controller 31, the MPEG AV decoder 19 separates a PES received from the multiplexer/demultiplexer 14 into a video elementary stream and an audio elementary stream. The MPEG AV decoder 19 then carries out a predetermined decoding process on the elementary streams, supplying video data of a base band to the video-signal post-processing circuit 20 and audio data of the base band to an audio-signal post-processing circuit 24.

In accordance with a command issued by the system controller 31, the video-signal post-processing circuit 20 switches the input from a video signal supplied by the video-signal preprocessing circuit 12 to video data of the base band supplied by the MPEG AV decoder 19 or vice versa, and synthesizes the video signal and the video data. The video-signal post-processing circuit 20 also carries out filtering on the input data and supplies the filtered data to an on-screen display circuit 21. In addition, the video-signal post-processing circuit 20 also provides a GUI (Graphic User Interface) for displaying pictures and generates a representative picture of a program represented by picture data. The video-signal post-processing circuit 20 then pastes the representative picture of a program on a window and supplies the window to the on-screen display circuit 21.

In accordance with a command issued by the system controller 31, the on-screen display circuit 21 converts text information into corresponding picture data and superposes the picture data obtained as a result of the conversion on picture data received from the video-signal post-processing circuit 20. The on-screen display circuit 21 then supplies the superposed picture data to an NTSC encoder 22.

In accordance with a command issued by the system controller 31, the NTSC encoder 22 converts picture data (or a component digital signal) received from the onscreen display circuit 21 into Y and signals. Then, the NTSC encoder 22 generates an S video signal completing a D/A conversion process and an analog composite video signal. The NTSC encoder 22 supplies the S video signal completing a D/A conversion process and the analog composite video signal to an external apparatus through external video output terminals 23-1 and 23-2.

In accordance with a command issued by the system controller 31, the audio-signal post-processing circuit 24 carries out processes such as filtering, fading and conversational-speed conversion on audio data of the base band received from the MPEG AV decoder 19, supplying a result of the processes to a terminal a of a switch 25.

In accordance with a command issued by the system controller 31, the switch 25 sets its contact at a terminal a to supply audio data received from the audio-signal post-processing circuit 24 to a D/A converter 26, or a terminal b to supply audio data received from the A/D converter 6 to the D/A converter 26. The D/A converter 26 converts audio data received from the switch 25 into analog data in D/A conversion and supplies the analog data to an external apparatus by way of an external audio output terminal 27.

The system controller 31 reads out a program from a ROM (Read-Only Memory) 33 through a host bus 32 and executes the program to control other components. A RAM (Random-Access Memory) 34 is used properly for storing a program and data which are required for controlling the other components. The system controller 31, the ROM 33 and the RAM 34 are connected to each other and to an input/output interface 35 by the host bus 32. The input/output interface 35 is connected to a drive 36 for driving a magnetic disc 41, an optical disc 42, a magneto-optical disc 43 or a semiconductor memory 44. The input/output interface 35 is also connected to an input unit 37 including a keyboard, a mouse, buttons, switches and a remote commander.

The hard-disc recorder is capable of inputting and outputting not only an analog signal, but also digital data. For example, an IRD (Integrated Receiver Decoder) not shown in the figure is allowed to supply a transport stream to a digital interface 15 through an IEEE (the Institute of Electrical and Electronic Engineers)-1394 serial bus connected to a digital input/output terminal 16. In accordance with a command issued by the system controller 31, the digital interface 15 carries out an interfacing process to supply the input transport stream to the multiplexer/demultiplexer 14. In accordance with a command issued by the system controller 31, the multiplexer/demultiplexer 14 outputs the transport stream received from the digital interface 15 to the buffer controller 17.

The multiplexer/demultiplexer 14 also outputs a transport stream received from the buffer controller 17 to the digital interface 15. The digital interface 15 supplies the transport stream received from the multiplexer/demultiplexer 14 to the external IRD through a digital input/output terminal 16 and the IEEE-1394 serial bus. The IRD outputs the transport stream on a monitor connected thereto to be displayed on the monitor.

In this embodiment, the hard-disc recorder is connected to the IRD as described above. It should be noted, however, that the scope of the present invention is not limited to this configuration. For example, the hard-disc recorder can also be connected to a personal computer or another apparatus.

In addition, while a video signal is compressed by adoption of the MPEG technique, the scope of the present invention is not limited to this technique. That is to say, other compression techniques can also be adopted.

Furthermore, in place of a hard disc of the HDD 18, it is also possible to use other recording media such as an optical disc, a magneto-optical disc and a solid-state memory.

The following description explains processing carried out concurrently with a video-signal-recording operation to preserve only effective representative pictures of a video signal on the basis of evaluation values appended to the representative pictures of the video signal being recorded with reference to a flowchart shown in FIG. 2.

As shown in the figure, the flowchart begins with a step S1 to form a judgment as to whether or not an operation to record a video signal of a program has been completed. If the operation to record a video signal of a program is still being carried out, the flow of the processing goes on to a step S2 at which the video-signal pre-processing unit 12 forms a judgment as to whether or not each frame can serve as a candidate for a representative picture.

If a frame capable of serving as a candidate for a representative picture is detected, the flow of the processing goes on to a step S3 at which an evaluation value of the frame is computed and recorded into a hard disc of the hard-disc drive 18 along with an appearance time of the frame. The evaluation value of a frame is a value representing the degree of likeliness of the frame's serving as a representative picture.

Figure 3:
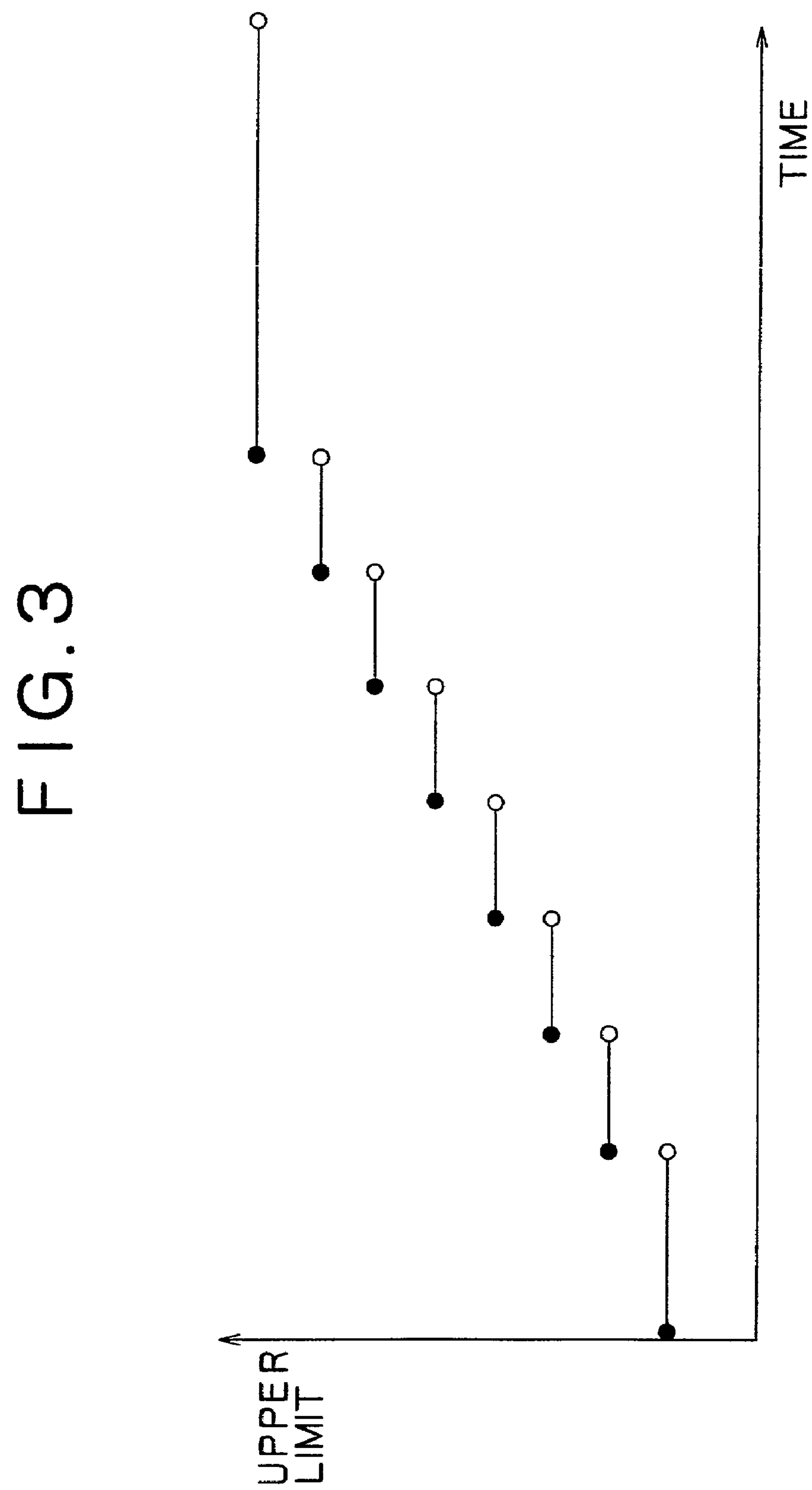
FIG. 3 is a diagram showing a typical relation between the lapse of a recording time and an allowable upper limit of a representative-picture-candidate count.

At the next step S4, the system controller 31 measures the lapse of the recording time up to the present time and compare the number of detected frames each capable of serving as a candidate for a representative picture with an allowable upper limit of the representative-picture-candidate count. FIG. 3 is a diagram showing a typical relation between the lapse of the recording time and the allowable upper limit of the representative-picture-candidate count. As shown in the figure, the allowable upper limit of the representative-picture-candidate count increases step by step with the lapse of the recording time.

The flow of the processing then goes on to a step S5 to form a judgment as to whether or not the number of detected frames each capable of serving as a candidate for a representative picture exceeds the allowable upper limit of the representative-picture-candidate count. If the outcome of the judgment indicates that the number of detected frames each capable of serving as a candidate for a representative picture exceeds the allowable upper limit of the representative-picture-candidate count, the flow of the processing goes on to a step S6 at which a thinning process is carried out.

At the step S6, the recorded representative pictures are searched for a specific one with a smallest evaluation value, and the appearance time of the specific representative picture with a smallest evaluation value is read out. Then, the flow of the processing then goes on to a step S7 to form a judgment as to whether or not the distribution of representative pictures will be too thin if the specific representative picture is deleted. Typically, in the formation of this judgment, the difference in time between a representative picture immediately preceding the specific representative picture and a representative picture immediately following the specific representative picture is compared with a threshold value T. If the difference in time between the immediately preceding and immediately following representative pictures is found greater than the threshold value T, the distribution of representative pictures that will result from the deletion of the specific representative picture is determined to be too thin.

If the distribution of the representative pictures that will result from the deletion of the specific representative picture is determined to be not too thin, the flow of the processing goes on to a step S8 at which the record of the picture with a smallest evaluation value is deleted from the hard disc of the hard-disc drive 18.

If the outcome of the judgment formed at the step S7 indicates that the distribution of representative pictures will be too thin by the thinning process applied to the specific representative picture, on the other hand, the flow of the processing goes on to a step S9 to form a judgment as to whether or not remaining representative pictures not detected in the search operation as a candidate with a minimum smallest evaluation value still exist. If the outcome of the judgment indicates that remaining representative pictures not detected in the search operation still exist, the flow of the processing goes on to a step S11 at which the remaining representative pictures not detected in the search operation as a candidate with a minimum smallest evaluation value is searched in the same way as the step S6 to find out a specific representative picture with a next larger smallest evaluation value and the appearance time of the specific representative picture with a smallest evaluation value is read out. Then, the flow of the processing then goes back to the step S7.

During the pieces of processing carried out at the steps S7, S9 and S10, the outcome of the judgment formed at the step S9 may indicate that no more representative pictures not detected in search operations as a candidate with a minimum smallest evaluation value exist. In this case, the flow of the processing goes on from the step S9 to a step S10. At the step S10, the threshold value T is slightly increased. Then, the flow of the processing then goes back to the step S7.

By carrying out the above processing, it is possible to avoid a state in which not even one representative picture exists in a certain range. In addition, representative pictures are erased sequentially one picture after another, starting with one having a smallest evaluation value.

A concrete example of the processing described above is explained by referring to FIG. 4.

Figure 4A:
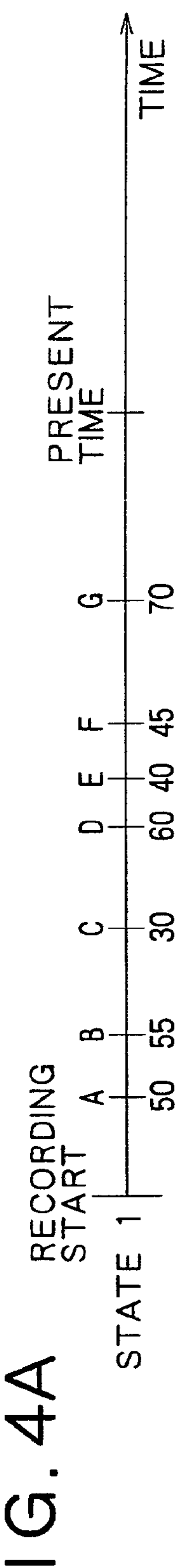
FIG. 4A is a diagram showing state 1 in which candidates for representative pictures A to G having different evaluation values are detected at their respective locations.
Figure 4B:
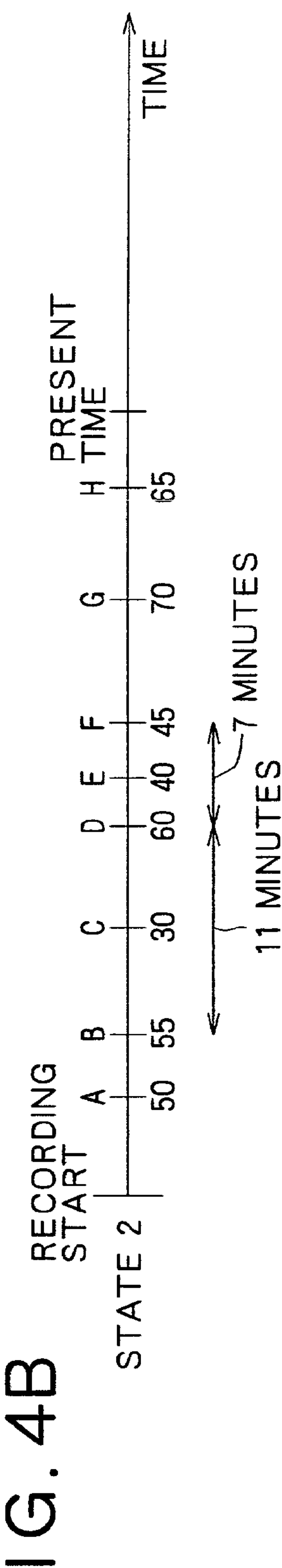
FIG. 4B is a diagram showing state 2 in which a candidate H for a representative picture is newly detected.

FIG. 4A is a diagram showing state 1 in which candidates for representative pictures A to G having different evaluation values are detected at their respective locations. Numbers shown below notations A to G denoting candidates for representative pictures are the evaluation values of the respective representing pictures. Assume that the threshold value T is 10 minutes and the present time is 30 minutes after the start of the recording operation. Let the allowable upper limit of the representative-picture-candidate count for the time lapse of 30 minutes be 7. FIG. 4B is a diagram showing state 2 in which a candidate H for a representative picture is newly detected.

Figure 4C:
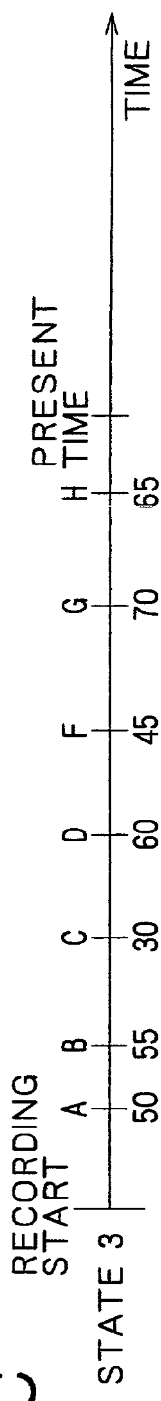
FIG. 4C is a diagram showing a state after completion of a thinning process.

In state 2, since the number of candidates for representative pictures is 8 exceeding the allowable upper limit of 7, a thinning process needs to be carried out. Among the 8 candidates, the candidate C has a smallest evaluation value of 30. If the candidate C is taken away, however, the time between the candidate B immediately preceding the candidate C and the candidate D immediately succeeding the candidate C will be 11 minutes, which exceed the threshold value T of 10 minutes. In this case, the outcome of the judgment formed at the step S7 indicates that the distribution of the representative pictures is too thin. Since the outcome of the judgment formed at the step S9 indicates that the representative pictures A, B, D, E, F, G and H, which were not detected in the search operation as a candidate with a minimum smallest evaluation value still exist, attention is now paid to the candidate E found in the search operation carried out at the step S11 as a candidate with a next larger smallest value of 40. If the candidate E is taken away, the time between the candidate D immediately preceding the candidate C and the candidate D immediately succeeding the candidate F will be 7 minutes, which does not exceed the threshold value T of 10 minutes. In this case, the outcome of the judgment formed at the step S7 indicates that the distribution of the representative pictures is not too thin. Thus, the candidate E is deleted in a thinning process at the step S10. A state after completion of this thinning process is shown in FIG. 4C as state 3.

Another method of carrying out a thinning process on representative pictures is explained as follows.

By not displaying many similar pictures as representative pictures, the user is capable of selecting a representative picture containing a lot of information. A number of representative pictures similar to each other is not useful to the user in selection of one representing a desired program or a desired scene.

In such a case, a histogram of each representative picture is acquired and stored. The thinning algorithm then needs to be changed so that there are no many representative pictures having similar histograms or similar contents.

According to the new algorithm, when a new representative picture is added, the new representative picture is compared with representative pictures obtained in the past to form a judgment as to whether or not a similar past representative picture already exists. If a similar past representative picture already exists, a thinning process can be carried out on a priority basis. As an alternative, the evaluation value of the representative picture is reduced.

Figure 5:
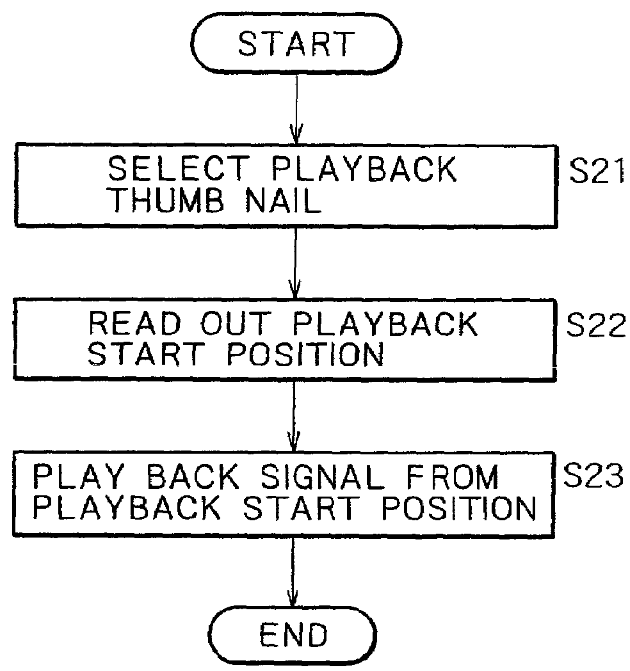
FIG. 5 is a flowchart representing playback processing of the hard-disc recorder.
Figure 6:
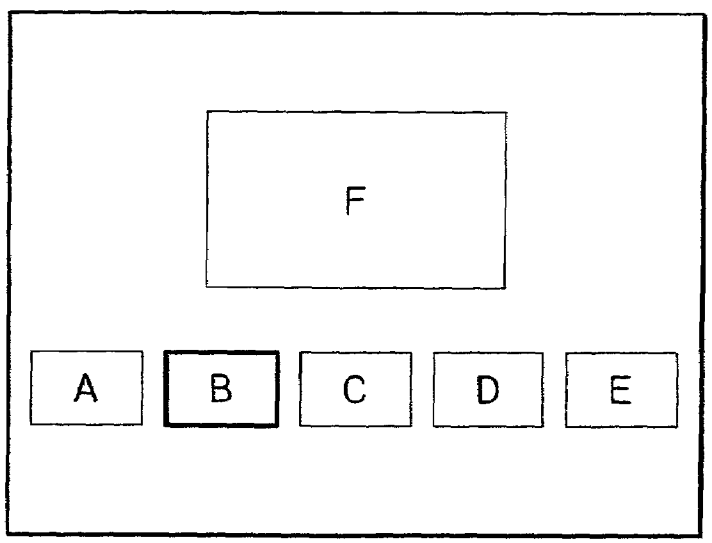
FIG. 6 is a diagram showing a typical GUI (Graphical User Interface) display in a playback operation.

Next, processing to start an operation carried out by the user to play back titles represented by representative pictures is explained by referring to a flowchart shown in FIG. 5. As shown in FIG. 5, the flowchart begins with a step S21 at which representative pictures representing a group of titles stored in the hard-disc drive 18 are displayed at positions A to E as shown in FIG. 6. The displayed representative pictures are each referred to hereafter as a thumb nail. The user can move the cursor to one of the thumb nails that represents a desired program to play back the program. It should be noted that the thumb nail pointed to by the cursor is high-lighted and an enlarged display is shown at an F position.

At the next step S22, the hard disc of the hard-disc drive 18 is searched for the storage location of the selected representative picture and the representative picture is read out from the hard-disc drive 18. Then, at the next step S23, the selected representative picture is read out from the hard disc of the hard-disc drive 18.

As described above, the hard-disc recorder provided by the present invention allows the user to select an appropriate thumb nail representing a desired program. The selected representative picture is effectively used by the user as an aid to grasp the contents of a program and to select a start position of a playback operation. In addition, a thinning process is carried out on representative pictures neither at the end of a recording operation nor during a playback operation, but during a recording operation. Thus, only a storage area with a small size for storing representative pictures is required. Furthermore, a large amount of processing is no longer required at the end of a recording operation or during a playback operation. As a result, responsiveness to a demand raised by the user is improved.

By the way, the series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording memory employed in typically a general-purpose personal computer capable of executing the programs to carry out the pieces of processing.

As shown in FIG. 1, recording media for presenting a program to the user is distributed separately from the computer. In order to present a program to the user, however, the use of package media is not mandatory. Examples of the recording media are the magnetic disc 41 including a floppy disc, the optical disc 42 including a CD-ROM (Compact-Disc Read-Only Memory) and a DVD (Digital Versatile Disc), the magneto-optical disc 43 including an MD (Mini Disc) and the semiconductor memory 44. As an alternative, a program can also be presented to the user by incorporating the program in the computer in advance. That is to say, the program is stored in a ROM or a hard disc included in the HDD.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or independently.

In addition, the technical term 'system' used in this specification means the whole equipment comprising a plurality of apparatuses.

While a preferred embodiment of the present invention has been described using specific terms, such description is for illustrative purposes only, and it is to be understood that changes and variations may be made without departing from the spirit or scope of the following claims.

What is claimed is:

1. A video-signal recording and playback apparatus for recording and playing back a video signal of a television-broadcast program, said video-signal recording and playback apparatus comprising:

a recording mechanism configured to record a video signal onto an information-recording medium;

an extraction mechanism configured to extract a representative picture from a video signal to be recorded;

an attachment mechanism configured to associate an evaluation value to the representative picture extracted by said extraction mechanism, said evaluation value being indicative of a degree of likeness of the representative picture to other representative pictures;

a preservation mechanism configured to preserve a representative picture extracted by said extracting means in said information-recording medium; and a thinning mechanism configured to reduce a number of representative pictures preserved by said preservation mechanism in said information-recording medium based on said evaluation value, wherein said attachment mechanism is configured to associate the evaluation value to the representative picture by reducing other evaluation values of representative pictures adjacent on a time axis.

2. A video-signal recording and playback apparatus according to claim 1, wherein said extraction mechanism, said attachment mechanism, said preservation mechanism, and said thinning mechanism are configured to carry out their respective pieces of processing concurrently with processing carried out by said recording means to record a video signal onto said information-recording medium.

3. A video-signal recording and playback apparatus according to claim 1, wherein said attachment mechanism is configured to associate evaluation values to representative pictures in such a way that said evaluation values are dispersed along said time axis.

4. A video-signal recording and playback apparatus according to claim 1, wherein said thinning mechanism is configured to carry out a thinning process on representative pictures recorded by said preservation mechanism on said information-recording medium on the basis of resemblance of said representative pictures.

5. A video-signal recording and playback method adopted in a video-signal recording and playback apparatus for recording and playing back a video signal of a television-broadcast program, said video-signal recording and playback method comprising:

recording a video signal onto an information-recording medium;

extracting a representative picture from said video signal to be recorded;

attaching an evaluation value to said representative picture extracted at said extracting step, said attaching including reducing other evaluation value of representative pictures adjacent on a time axis, said evaluation value being indicative of a degree of likeness of the representative picture to other representative pictures;

preserving said representative picture extracted at said extracting step in said information-recording medium; and carrying out a thinning process on a number of representative pictures preserved at said preserving step in said information-recording medium on the basis of said evaluation value attached by said attaching means.

6. A recording medium for storing a program to be executed by a video-signal recording and playback apparatus for recording and playing back a video signal of a television-broadcast program, wherein said program is a computer readable program, execution of instructions of program implement a method comprising:

recording a video signal onto an information-recording medium;

extracting a representative picture from said video signal to be recorded;

attaching an evaluation value to said representative picture extracted at said extracting step, said attaching including reducing other evaluation values of representative pictures adjacent on a time axis, said evaluation value being indicative of a degree of likeness of the representative picture to other representative pictures;

preserving said representative picture extracted at said extracting step in said information-recording medium; and carrying out a thinning process on a number of representative pictures preserved at said preserving step in said information-recording medium on the basis of said evaluation value attached by said attaching means.

* * * * *